US007734106B1

United States Patent
Zhang et al.

(10) Patent No.: US 7,734,106 B1
(45) Date of Patent: Jun. 8, 2010

(54) METHOD AND APPARATUS FOR DEPENDENT CODING IN LOW-DELAY VIDEO COMPRESSION

(75) Inventors: Rui Zhang, Pleasanton, CA (US); Jiangtao Wen, La Jolla, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 1203 days.

(21) Appl. No.: 11/314,628

(22) Filed: Dec. 21, 2005

(51) Int. Cl.
*G06K 9/34* (2006.01)
*G06K 9/46* (2006.01)
(52) U.S. Cl. ................. 382/239; 382/236; 382/238
(58) Field of Classification Search ......... 382/236, 382/238, 239, 248, 251; 375/240.16, 240.24
See application file for complete search history.

(56) References Cited

U.S. PATENT DOCUMENTS 7,010,044 B2 * 3/2006 Dattani et al. ........ 375/240.24

2006/0104359 A1 * 5/2006 Zhou et al. ........... 375/240.16
2006/0153300 A1 * 7/2006 Wang et al. .......... 375/240.16

OTHER PUBLICATIONS

Yang, H. et al., Advances in Recursive Per-Pixel Estimation of End-to-End Distortion for Application in H.264, IEEE, 2005, pp. 906-909.
Zhang, R. et al., Prescient Mode Selection for Robust Video Coding, IEEE, 2001, pp. 974-977.

* cited by examiner

*Primary Examiner*—Phuoc Tran
(74) *Attorney, Agent, or Firm*—North Weber & Baugh LLP

(57) ABSTRACT

An apparatus comprising an encoder circuit and a storage circuit. The encoder circuit may be configured to generate a reliability score and a referral score for each partition in an input data stream. The input data stream may be encoded based upon the reliability score and the referral score for each partition. The storage circuit may be configured to store the reliability score for each partition of the input data stream.

20 Claims, 4 Drawing Sheets

METHOD AND APPARATUS FOR DEPENDENT CODING IN LOW-DELAY VIDEO COMPRESSION

FIELD OF THE INVENTION

The present invention relates to data compression generally and, more particularly, to a method and apparatus for dependent coding in low-delay video compression.

BACKGROUND OF THE INVENTION

Video compression is performed by exploiting a correlation between signals in the temporal and spatial domains. Using a process referred to as motion compensation, an image may be transmitted or stored by encoding a prediction error (or residue) signal, instead of the original signal. The use of motion compensation introduces dependencies among the encoded frames (i.e., the quality of the reference frame affects the quality of the reconstructed frames). Conventional video coding systems do not explore such dependencies fully, especially if the video sequence is encoded in a single encoding pass.

Conventional video coding systems perform compression in a localized manner. Specifically, conventional systems attempt to achieve optimized compression quality for individual frames with little or no consideration about the variation of visual quality as a function of time and quality dependencies between different regions of the reconstructed video in neighboring frames.

It would be desirable to have a method and/or apparatus that incorporates the dependencies introduced by motion compensation and other forms of prediction into the parameter setting and mode selection process of video encoding.

SUMMARY OF THE INVENTION

The present invention concerns an apparatus comprising an encoder circuit and a storage circuit. The encoder circuit may be configured to generate a reliability score and a referral score for each partition in an input data stream. The input data stream may be encoded based upon the reliability score and the referral score for each partition. The storage circuit may be configured to store the reliability score for each partition of the input data stream.

The objects, features and advantages of the present invention include providing a method and/or apparatus for dependent coding in low-delay video compression that may (i) generate a reliability score that keeps track of motion compensation references as a result of previous encoding decisions, (ii) generate a referral score that projects how a current partition may be referenced by subsequently coded partitions, (iii) maintain reliability and referral scores for each partition in an input data stream, (iv) select encoding parameters based on the reliability and referral scores, (v) refine scores using an iterative encoding process and/or (vi) incorporate the reliability score into motion estimation and mode decision processes.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally provides a computationally efficient process for incorporating dependencies introduced by motion compensation and other forms of prediction (e.g., intra frame prediction such as in H.264) into the parameter setting and mode selection process of video encoding. The present invention may be used for both on-line (or real-time) encoding and offline (or non-real-time) encoding. The present invention generally provides a process for generating a reliability (or quality) score and a referral score for each partition (e.g., macroblock or sub-block of a macroblock) generated during motion estimation and compensation of an input video sequence (or data stream). The reliability and referral scores may be used to guide selection of encoding parameters (e.g., quantization parameter (QP), etc.) as well as decisions at various encoder steps (e.g., macroblock partitioning modes, etc.). As used herein, the term "reliability (or quality) score" generally refers to a value configured to keep track of the quality of coded partitions. The reliability score may be used to infer the quality of a current partition if compensated using different predictions. As used herein, the term "referral score" generally refers to a value configured to project how the current partition will be referenced by partitions that will subsequently be encoded.

Figure 1:
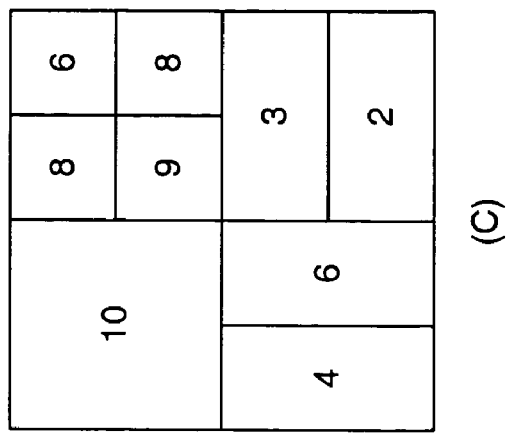
FIGS. 1(A-C) are block diagrams illustrating association of reliability scores to macroblock partitions determined during motion estimation/compensation.
Figure 1:
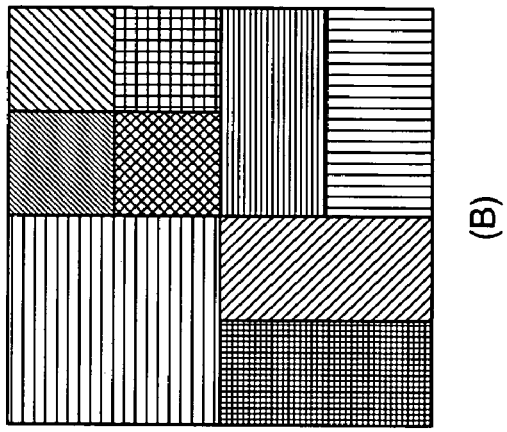
Figure 1:
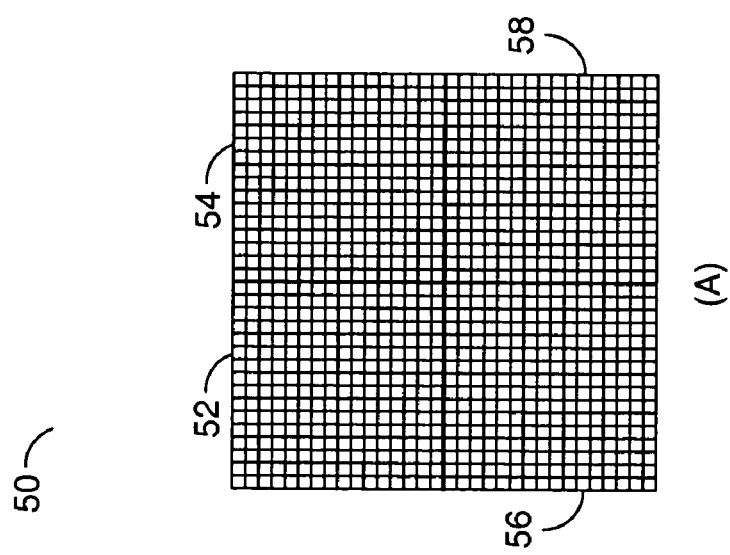

Referring to FIGS. 1(A-C), block diagrams are shown illustrating an example of reliability scores associated to macroblock partitions in accordance with the present invention. In general, an image 50 may include a number of spatially neighboring macroblocks 52-58 (FIG. 1A). The macroblocks 52-58 generally comprise an array of pixels (e.g., 32×32, 16×16, etc.). Each of the macroblocks 52-58 may be partitioned in a manner determined during motion estimation/compensation (FIG. 1B). For example, a compression standard (e.g., H.264, MPEG-4, etc.) may define a number of modes for motion estimation/compensation and intra frame prediction, where each mode corresponds to a different way in which the macroblock may be partitioned.

Referring to FIG. 1B, each partition may be associated with a respective motion vector (e.g., illustrated by different shading patterns; partitions with the same motion vection have the same shading) that may be used in predicting the partition from a reference partition. The macroblock 52 may be predicted, in one example, using a single motion vector. The macroblock 54 may be partitioned, in one example, into four 8×8 sub-blocks and predicted using four motion vectors. The macroblock 56 may be partitioned, in one example, into two 16×8 sub-blocks and predicted using two motion vectors. The macroblock 58 may be partitioned, in one example, into two 8×16 sub-blocks and predicted using two motion vectors. Although each of the sub-blocks is illustrated having a different motion vector (e.g., illustrated by the different shading patterns), in real applications sub-blocks may or may not have similar motion vectors.

Referring to FIG. 1C, reliability scores may be assigned, in one example, to each of the macroblock partitions generated during motion estimation/compensation. The reliability score may be used to infer the quality of a current partition if compensated using different predictions. Partitions with different motion vectors may have similar reliability scores. In general, the numbers presented in FIG. 1C are illustrative and not intended to be representative of typical values obtained when practicing the present invention.

Figure 2:
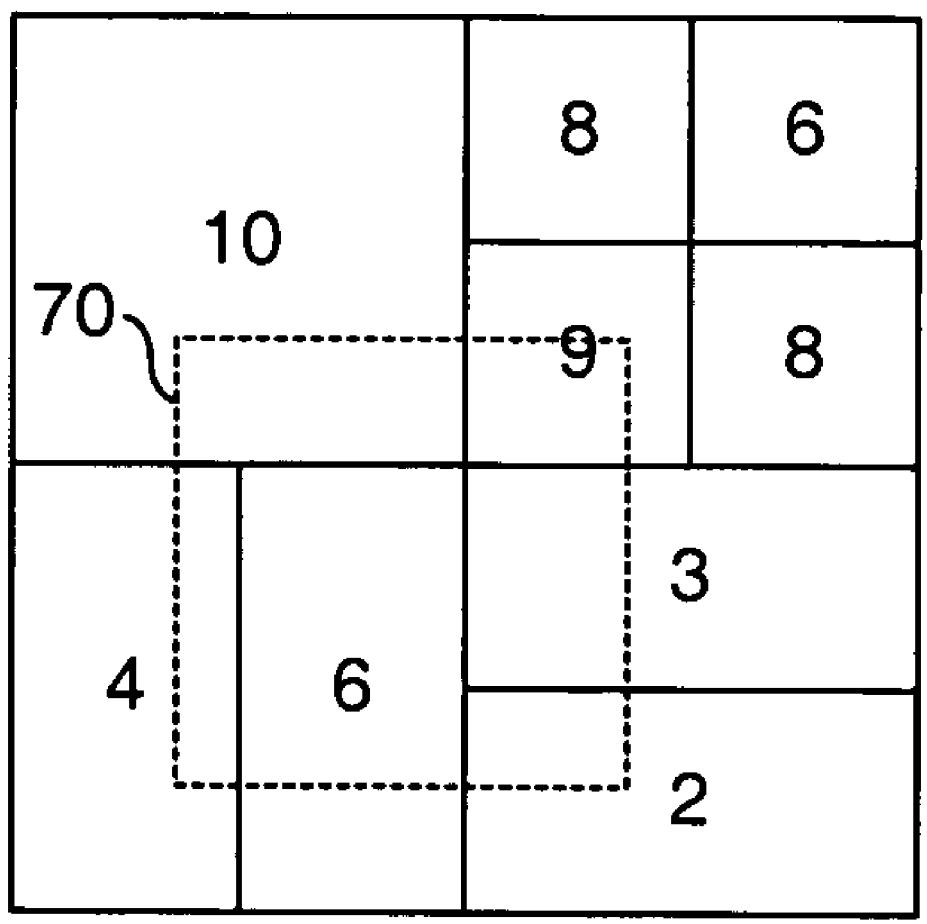
FIG. 2 is a block diagram illustrating determination of reliability scores for pixels in a reference block in accordance with a preferred embodiment of the present invention.

Referring to FIG. 2, a diagram is shown illustrating a reference frame 70 containing a number of reference pixels for a current partition in a current macroblock. As in motion estimation, the referenced pixels for the current partition may not be aligned with a macroblock or partition boundary used when performing motion compensation for a previous macroblock. The present invention generally provides a number of techniques for inferring the reliability (or quality) of the referenced pixels based on the number of pixels in the reference block drawn from different partitions, as well as the operations performed on top of the reconstructed values of the reference pixels before the reference is obtained (e.g., interpolation operations for fractional-pel motion compensation, etc.).

The process of determining the quality of the reference pixels may be referred to as an "evaluation phase." In a preferred embodiment of the present invention, the evaluation phase may be implemented as a filtering process. For example, the reliability scores as a function of pixel location in the frame 70 may be mapped to a "reliability image." In the reliability image, each pixel may have a value corresponding to the reliability score of the partition in which the pixel is spatially located for motion estimation/compensation. Based on the location of the reference pixels (including sub-pel locations), the reliability image may be filtered to obtain an overall reliability score.

In a preferred embodiment, the above filtering process may be implemented using the same filter that is used to perform pixel interpolation for sub-pel motion estimation to calculate the reliability scores of the pixels in the reference block 70. For example, if the spatial locations of referred pixels coincide with pixels in the referred frame (e.g., the motion vectors are integer-pel only), the reliability scores of the pixels may be used. Otherwise, the reliability scores of the closest integer positioned pixels may be filtered to obtain the reliability scores of the referred pixels. In a simplified example, the number of pixels that are spatially closest to the ones used as the references may be counted and the reliability score of each pixel in the reference set to the reliability score of the closest, spatially, neighboring pixel.

In another preferred embodiment of the present invention, the individual pixels in the reference may be calculated using methods similar to those found in R. Zhang, S. L. Regunathan, K. Rose, PRESCIENT MODE SELECTION FOR ROBUST VIDEO CODING, Proc. IEEE Intl. Conf. Image Processing, 2001, pp. 974-977 and H. Yang, K. Rose, ADVANCES IN RECURSIVE PER-PIXEL ESTIMATION OF END-TO-END DISTORTION FOR APPLICATION IN H.264, Proc. IEEE Intl. Conf. Image Processing, 2005, pp. 906-909 (which are incorporated herein by reference in their entirety), where the combined impact of motion compensation, quantization and mode decisions on the quality of reconstructed frames is estimated in a high-complexity, usually recursive fashion, with the transmission error rate set to zero.

After the reliability scores for the individual pixels in the reference have been calculated, the pixel-wise reliability information may be consolidated for use in subsequent encoding modules. For example, the pixel-wise reliability information may be consolidated using methods that include, but are not limited to, arithmetic or geometric averages, median filters and/or exclusion of the outliers.

The process for determining the referral score may be referred to as the "prediction phase." In low-delay video compression without look-ahead, knowing precisely how future partitions may perform motion compensation and intra prediction is not generally possible. The encoder generally predicts how motion compensation and/or intra prediction operations will be performed for partitions or frames yet to be coded. Such evaluations may be made for all possible modes of partitioning subsequently coded frames or areas (e.g., in the case of intra prediction), that might use the current partition as the prediction. The contributions of each of these subsequently coded partitions should be weighted by the confidence level of the corresponding extrapolation of the trajectory of the motion.

In a preferred embodiment of the present invention, the determination of referral scores may be accomplished by, in one example, extending (extrapolating) the motion trajectory from frames that have already been coded (with possible adjustments to the direction of the motion vectors as a result of out-of-display-order encoding (e.g., in the case of B frames) and/or intra prediction directions for spatially neighboring partitions that have already been encoded. In a preferred embodiment of the present invention, the weight for the contribution from each subsequently coded partition may be inversely proportional to the temporal distance between the display times of the current partition and the subsequently coded partition. For applications where two-pass encoding or look-ahead motion estimation (e.g., either a rough search or the entire motion estimation procedure) is present, the prediction procedure may rely on motion vectors obtained in the first encoding pass or via looking-ahead for partitions that are encoded after the current partition.

As when referral scores are determined, motion estimation and/or mode decisions for subsequently coded partitions for which referral scores are derived may not yet be performed. The referral scores for the partitions may be estimated based upon all possible modes of partitioning the subsequently encoded frames or areas (e.g., in the case of intra prediction).

Figure 3:
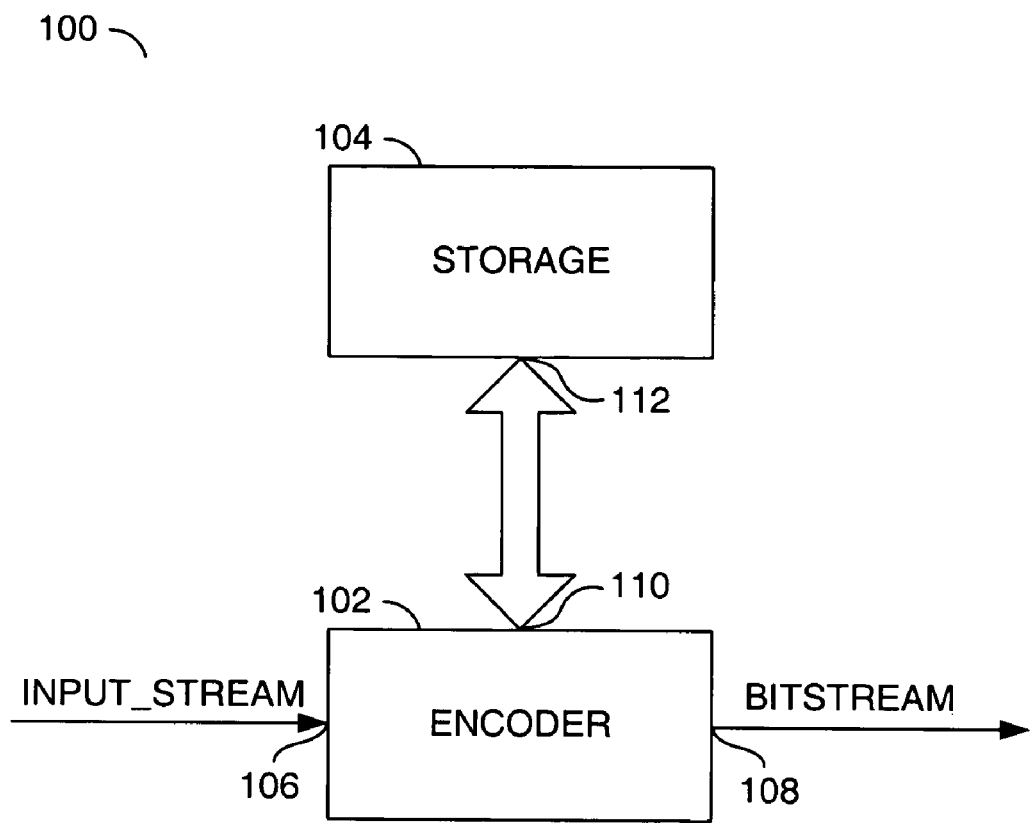
FIG. 3 is a block diagram illustrating an encoding system in accordance with a preferred embodiment of the present invention.

Referring to FIG. 3, a block diagram is shown illustrating a circuit 100 in accordance with a preferred embodiment of the present invention. The circuit 100 may be implemented, in one example, as a video sequence encoder. The circuit 100 may comprise a circuit (or block) 102 and a circuit (or block) 104. The circuit 102 may be implemented as an encoder circuit. The circuit 104 may be implemented as a storage circuit. In one example, the circuit 104 may be implemented as one or more memory devices.

The circuit 102 may be configured to receive a signal (e.g., INPUT_STREAM) at an input 106 and present a signal (BITSTREAM) at an output 108. The circuit 102 may have an input/output 110 that may be coupled to an input/output 112 of the circuit 104. In one example, the signal INPUT_STREAM may comprise an input data stream (e.g., a video sequence including a plurality of macroblocks). The signal BITSTREAM may comprise an encoded bit stream. In one example, the signal BITSTREAM may implemented in compliance with one or more coding standards or systems (e.g., MPEG, H.263, H.264, etc.).

In one example, the circuit 102 may be configured to generate (or determine) reliability and referral scores for each macroblock (or partition thereof) in the signal INPUT_STREAM. The reliability and referral scores may be used to control one or more steps of an encoding process implemented in the circuit 102. The reliability and referral scores may be stored in the circuit 104. In one example, the circuit 104 may be implemented within a memory of the circuit 102.

Figure 4:
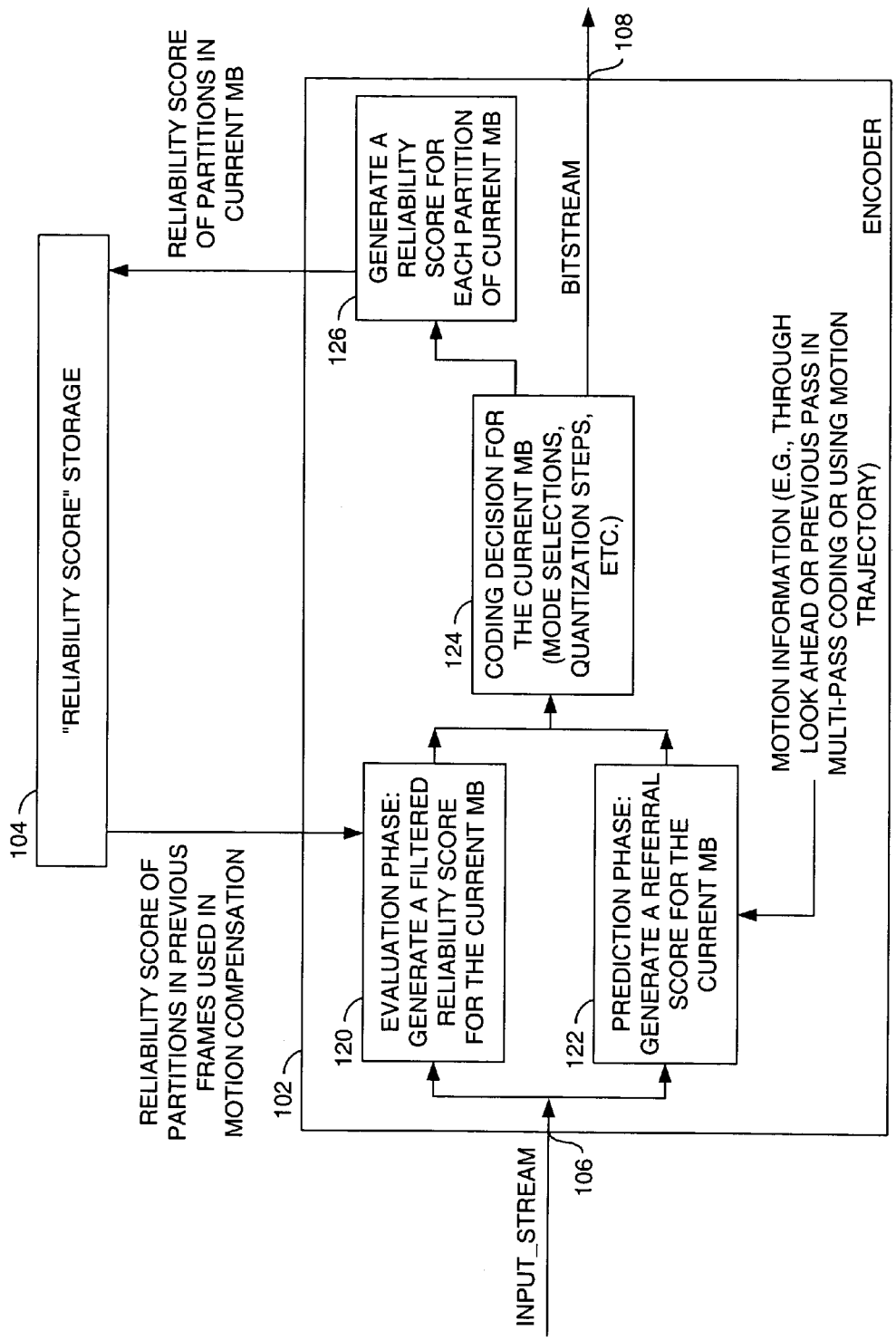
FIG. 4 is a block diagram illustrating an example of an encoding process in accordance with a preferred embodiment of the present invention.

Referring to FIG. 4, a block diagram illustrating an example operation of the encoder 102 is shown. In one example, the encoder 102 may comprise a block (or circuit) 120, a block (or circuit) 122, a block (or circuit) 124 and a block (or circuit) 126. The block 120 may implement an evaluation phase of the present invention. The block 122 may implement a prediction phase of the present invention. The block 124 may be configured to perform coding decisions based upon reliability and referral scores. The block 126 may be configured to generate reliability scores. The blocks 120-126 may be implemented in hardware, firmware or software.

The signal INPUT_STREAM may be presented to an input of the block 120 and an input of the block 122. The block 120 may have a second input that may receive reliability scores of partitions in previous frames using motion compensation from the memory 104. The block 120 may have an output that may present a signal to a first input of the block 124. The signal may comprise one or more reliability scores for the current macroblock. The block 122 may have a second input that may receive motion information (e.g., through look ahead or a previous pass in multi-pass coding or using motion trajectory). The block 122 may have an output that may present a signal to a second input of the block 124. The signal may comprise one or more referral scores for the current macroblock. In one example, the block 120 may be configured to filter reliability scores retrieved from the memory 104. In one example, the block 122 may be configured to determine the referral score or scores for the current macroblock.

The block 124 may be configured to perform coding decisions for the current macroblock. For example, the block 124 may be configured to perform mode selections, quantization steps and any other coding decision involved in the encoding and/or compression of the current macroblock. The block 124 may be compliant with one or more encoding/compression standards (e.g., MPEG-2, MPEG-4, H.264, etc.). The block 124 may have a first output that may present the signal BITSTREAM. The block 124 may have a second output that may present a signal to an input of the block 126. In one example, the signal may comprise partition and prediction information for the current macroblock. The block 126 may be configured to determine (e.g., calculate) a reliability score for each partition of the current macroblock. For example, the block 126 may be configured to implement the processes for calculating reliability scores described above. The block 126 may have an output that may present the reliability scores of the partitions of the current macroblock to the memory 104. The reliability scores may be stored for later use by the block 120 during the evaluation phase.

In a preferred embodiment of the present invention, the block 102 may be configured to select a target quality as well as associated tools for the current partition to be encoded with reference to the prediction with the associated reliability based on the consolidated reliability information, the target bitrate, as well as the referral score as determined in the prediction process as described above. The associated tools may include, but are not limited to, video coding modes and quantizers that might be parameterized by quantization parameters and/or dead zones. In setting the target quality, a number of strategies may be used. In one preferred embodiment, the quantization parameter (QP) may be selected such that the estimated or actual distortion of the partition after motion compensation and coding is not greater than that of the worst distortion for all partitions in the previous frame multiplied by a predetermined "comfort zone."

In one example, the predetermined comfort zone may be dynamically adjustable to account for rate control and encoding/network buffer specifications. For example, when the encoder determines that the available bits are running out due to previously coded frames, the encoder may increase the size of the comfort zone. The referral score generally represents a measure of how often the current partition will be referenced by motion compensation as well as intra prediction. In general, the referral score generally provides an indication of how big an impact the current partition will have on the quality of subsequently coded partitions.

In general, everything else being equal, the lower the reliability score, or the higher the referral score, the finer the quantization used for the current partition and the higher the contribution of the distortion in the rate-distortion (RD) analysis when choosing the encoding mode and making other rate-distortion optimized decisions for the current partition. For applications with no real-time requirements, the signal INPUT_STREAM (e.g., an input video sequence, data stream, etc.) may be encoded via a number of iterations in which the quality and referral scores may be refined in each iteration based on the temporal and spatial prediction dependencies established from the previous iteration. In one example, the initial scores may be set either (i) to default values (e.g., using the regular, macroblock and frame based rate-distortion (RD) optimized encoding process as the first iteration) or through the above described procedure for non-iterative encoding.

The reliability (or quality) score may also be incorporated into the motion estimation and mode decision process for improved RD based prediction. In one example, a model for the relationship between the rate, the target quality as determined based on overall bitrate, quality and the quality score, as well as the prediction error may be used to determined the optimal motion vector to use for the current partition. The target quality may also be determined in conjunction with the referral score. In a preferred embodiment of the present invention, the block 102 may be configured to examine variations of the pixel-wise reliability and referral scores and determine an appropriate motion estimation partition size for the current macroblock.

In video coding standards such as MPEG, only certain granularity is supported. For example, the standard may not provide a means of signaling the use of different quantization parameters for different partitions of a macroblock (e.g., only a global macroblock quantization parameter may be supported). In such a case, the choice of encoding tools and parameters of partitions should be consolidated by examining the relative size and importance (e.g., as indicated by quality and referral scores) of the partitions and selecting overall macroblock parameters that best satisfy constraints imposed by individual partitions. For example, if a quantization parameter QPi can reach a target quality for a partition i, then min QPi may achieve target quality for all partitions and can be used for the macroblock, where using min QPi satisfies overall bitrate and buffer fullness criteria.

The functions performed by the functional block diagram of FIG. 4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    an encoder circuit configured to generate a reliability score and a referral score for each partition in an input data stream, wherein the input data stream is encoded based upon the reliability score and the referral score for each of said partitions; and
    a storage circuit configured to store the reliability score for each of said partitions of said input data stream, wherein said encoder circuit is further configured to refine said reliability score and said referral score for each of said partitions over a number of iterations.

2. The apparatus according to claim 1, wherein said encoder circuit is further configured to generate one or more of said partitions for each macroblock of said input data stream.

3. The apparatus according to claim 2, wherein said encoding circuit is configured to consolidate encoding parameters for different partitions of a macroblock to generate a macroblock-wise parameter that may be transmitted using a standard-compliant bitstream.

4. The apparatus according to claim 1, wherein said reliability score is incorporated into motion estimation, intra prediction and mode decision processes of said encoder circuit.

5. The apparatus according to claim 1, wherein said encoder circuit is further configured to determine a motion estimation or intra prediction partition size for a current partition based on pixel-wise reliability and said referral scores of a reference block.

6. The apparatus according to claim 1, wherein said encoder circuit is further configured to refine said reliability score and said referral score in a current iteration based on temporal and spatial prediction dependencies established from a previous iteration.

7. The apparatus according to claim 1, wherein said encoder circuit is further configured to generate said referral score by extrapolating a motion trajectory from old frames that have already been encoded to new frames yet to be encoded in all partitioning modes of said new frame.

8. The apparatus according to claim 1, wherein said encoder circuit is further configured to select one or more encoding parameters based on one or both of said reliability score and said referral score.

9. The apparatus according to claim 1, wherein said encoder circuit is further configured to select one or more quantization parameters (QP) based on one or both of said reliability score and said referral score.

10. The apparatus according to claim 1, wherein said generation of each of said reliability scores is based on quality values of each of a plurality of reference pixels used to predict said partitions.

11. An apparatus comprising:
    means for generating a reliability score and a referral score for each partition of an input data stream, wherein the input data stream is encoded based upon the reliability score and the referral score for each partition; and
    means for storing the reliability score for each partition of said input data stream, wherein said means for generating said reliability score is further configured to refine said reliability score and said referral score for each of said partitions over a number of iterations.

12. A method for accounting for prediction dependencies in an encoding process comprising the steps of:
    (A) generating a reliability score and a referral score for each partition of an input data stream using a circuit;
    (B) storing the reliability score for each of said partitions of said input data stream in a memory; and
    (C) encoding said input data stream based upon the reliability score and the referral score for each of said partitions, wherein said encoding includes refining said reliability score and said referral score in a current iteration based on temporal and spatial prediction dependencies established from a previous iteration.

13. The method according to claim 12, further comprising the step of:
    generating one or more of said partitions for each macroblock of said input data stream.

14. The method according to claim 12, wherein said reliability score is determined during a motion estimation and mode decision process.

15. The method according to claim 12, wherein said encoding includes determining a motion estimation or intra prediction partition size for a current partition based on pixel-wise reliability and said referral scores of a reference block.

16. The method according to claim 12, wherein said encoding includes refining said reliability score and said referral score over a number of iterations.

17. The method according to claim 12, wherein said referral score is generated by extrapolating a motion trajectory from old frames that have already been encoded to new frames yet to be encoded in all partitioning modes of said new frame.

18. The method according to claim 12, wherein said encoding includes selecting one or more encoding parameters based on one or both of said reliability score and said referral score.

19. The method according to claim 12, wherein said encoding includes selecting one or more quantization parameters (QP) based on one or both of said reliability score and said referral score.

20. The method according to claim 12, wherein said generation of each of said reliability scores is based on quality values of each of a plurality of reference pixels used to predict said partitions.

* * * * *